United States Patent
Gyo et al.

(10) Patent No.: US 8,150,966 B2
(45) Date of Patent: Apr. 3, 2012

(54) MULTI-PARTY COOPERATIVE PEER-TO-PEER VIDEO STREAMING

(75) Inventors: Yang Gyo, Plainsboro, NJ (US); Saurabh Mathur, Monmouth Junction, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 123 days.

(21) Appl. No.: 12/309,371

(22) PCT Filed: Jul. 20, 2006

(86) PCT No.: PCT/US2006/028105
§ 371 (c)(1),
(2), (4) Date: Jan. 15, 2009

(87) PCT Pub. No.: WO2008/010802
PCT Pub. Date: Jan. 24, 2008

(65) Prior Publication Data
US 2009/0234943 A1    Sep. 17, 2009

(51) Int. Cl.
G06F 15/173 (2006.01)
G06F 15/16 (2006.01)
H04H 60/45 (2008.01)

(52) U.S. Cl. .................... 709/224; 709/231; 725/91
(58) Field of Classification Search .............. 709/224, 709/231; 725/91
See application file for complete search history.

(56) References Cited

U.S. PATENT DOCUMENTS

| | | | |
|---|---|---|---|
| 7,536,470 B2 * | 5/2009 | Li et al. | 709/231 |
| 7,633,887 B2 * | 12/2009 | Panwar et al. | 370/254 |
| 2002/0049760 A1 | 4/2002 | Scott et al. | |
| 2004/0143672 A1 * | 7/2004 | Padmanabham et al. | 709/231 |
| 2008/0134258 A1 * | 6/2008 | Goose et al. | 725/91 |

FOREIGN PATENT DOCUMENTS

| | | |
|---|---|---|
| EP | 1217803 | 4/2004 |
| EP | 1643716 | 4/2006 |

OTHER PUBLICATIONS

Liao et al., "Peer-Owl: an adaptive data dissemination scheme for peer-to-peer streaming services," Grid and Cooperative Computing (GCC). Third International Conference Proceedings (Lecture notes in Computer Science vol. 3251), pp. 479-486, Springer-Verlag, Berlin, Germany, 2004.

Pouwelse et al., "Real-time video delivery using peer-to-peer bartering networks and multiple description coding," 2004 IEEE International Conference on Systems, Man and Cybernetics, Pt. vol. 5, pp. 4599-4605, Piscataway, NJ, USA.

Schiely et al., "Peer-to-peer distribution architectures providing uniform download rates," On the Move to Meaningful Internet Systems 2005, OTM Confederated International Conferences CoopIS, DOA, and ODBASE 2005. Proceedings (Lecure notes in Computer Science vol. 3760) Pt.vol. 2, pp. 1083-1096, Springer-Verlag.

International Search Report, dated Apr. 19, 2007.

* cited by examiner

*Primary Examiner* — Asghar Bilgrami
(74) *Attorney, Agent, or Firm* — Robert D. Shedd; Joseph J. Opalach; Catherine A. Cooper

(57) ABSTRACT

A method and apparatus for transmitting data are described including partitioning a stream of data into a plurality of sub-streams, establishing an allocation of the plurality of sub-streams among a plurality of sending devices, enabling the plurality of sending devices to simultaneously begin transmitting the plurality of sub-streams in accordance with the allocation and adjusting the allocation.

27 Claims, 3 Drawing Sheets

MULTI-PARTY COOPERATIVE PEER-TO-PEER VIDEO STREAMING

This application claims the benefit, under 35 U.S.C.§365 of International Application PCT/US2006/028105, filed 20 Jul. 2006, which was published in accordance with PCT Article 21(2) on 24 Jan. 2008, in English.

FIELD OF THE INVENTION

The present invention relates generally to networking and specifically to a peer-to-peer (P2P) network for video content streaming.

BACKGROUND OF THE INVENTION

Peer-to-Peer (P2P) networking has been proposed to support video content streaming service over the Internet. Each peer is implemented with both client and server functionality. The peers receive and cache the content, and stream the content to other peers. Due to the contribution from peers, the system, as a whole, can support more users than the traditional client-server service model.

In the current Internet, a large number of peers use ADSL or High-speed cable modems that have asymmetric upload/download bandwidth. The download bandwidth is typically much larger than the upload bandwidth. Therefore, although peers may have sufficient bandwidth to receive the streaming content, their upload bandwidth is not large enough to support other peers. The asymmetric bandwidth problem greatly affects the effectiveness of P2P video content streaming service.

Some prior art attempts to provide streaming service from multiple sources. Some prior art performs workload adjustment at the packet level. Other prior art schemes model the connections/links between peers as a Markov chain. Still other prior art schemes employ a probabilistic approach to solve the dynamic sub-stream adjustment problem.

SUMMARY OF THE INVENTION

The present invention provides a mechanism that allows a set of users (denoted as the sending peers herein) to collaboratively provide the streaming service to another user (denoted as the receiving peer) even if the individual sending peer's upload bandwidth is insufficient to stream the content to the receiving peer. The method and apparatus of the present invention solve the asymmetric bandwidth problem encountered in peer-to-peer video streaming service. As used herein peers include nodes, video playback devices, personal digital assistants (PDAs), computers including laptop computers, and any other devices capable of sending and receiving content in a per-to-peer network.

The present invention is a multi-party cooperative P2P streaming method that enables the peers with asymmetric bandwidth to cooperatively contribute bandwidth. The thrust of the present invention is to allow multiple sending peers to collaboratively stream the content to the receiving peer such that the aggregate upload bandwidth of sending peers is larger than the required streaming bandwidth, hence solving the asymmetric bandwidth problem.

A multi-party cooperative streaming method and apparatus are described including partitioning packets of a stream of content into sub-streams, allocating sub-streams for transmission evenly among the sending peers, issuing a command for the sending peers to simultaneously begin transmission of the sub-streams to a receiving peer and adjusting the number of sub-streams transmitted by the sending peers periodically.

A method and apparatus for transmitting data are described including partitioning a stream of data into a plurality of sub-streams, establishing an allocation of the plurality of sub-streams among a plurality of sending devices, enabling the plurality of sending devices to simultaneously begin transmitting the plurality of sub-streams in accordance with the allocation and adjusting the allocation.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

The present invention allows a set of peers (sending) to collaboratively provide video content streaming service to another peer (receiving) even if the individual sending/forwarding peer's upload bandwidth is insufficient to individually stream the content to the receiving peer. The method and apparatus of the present invention solves the asymmetric bandwidth problem encountered in P2P video content streaming. The present invention pro-actively probes the upload bandwidth and constantly tries to optimize the video streaming quality.

More specifically, the present invention partitions the packets into sub-streams. Since a sub-stream is a collection of packets, it effectively reduces the signaling overhead, and simplifies the dynamic workload adjustment strategy. Further, the method and apparatus of the present invention actively probe the available bandwidth by injecting more traffic over certain paths. The present invention reacts more quickly to the changing network environment, which is critical in P2P network setting. The present invention formulates the dynamic sub-stream adjustment problem as a Minimum-Weight-Perfect-Matching problem.

Let $\{s_i\}$, $i=1, 2, \ldots, N$, denote a set of N sending peers that have the content to stream to the destination/receiving peer, d. It is assumed that the N sending peers having the desired content have been identified by other means. The streaming video content is stored at the sending nodes as a collection of packets of equal size. Each of the identified sending nodes has a copy of the content. The packets have sequence numbers indicating their position in the video content stream. The video content stream is divided into M equal rate sub-streams. Each sub-stream has one packet out of every M packets. In the following, an apparatus is described that allows N peers to collectively send M sub-streams to d. Assume that the receiving peer d has the sufficient download bandwidth to receive the entire stream at rate r, while the sending peers, $s_i$'s upload bandwidth is limited and may be less than the streaming rate r. The number of sub-streams, M, is chosen to be greater than the number of sending peers, N. The architecture of the sending and receiving peers, respectively is described first. Later the Minimum-Weight-Perfect-Matching (MWPM) based algorithm that dynamically adjusts the number of sub-streams carried by each sending peer so as to optimize the perceived streaming quality at the receiving peer is described.

Figure 1:
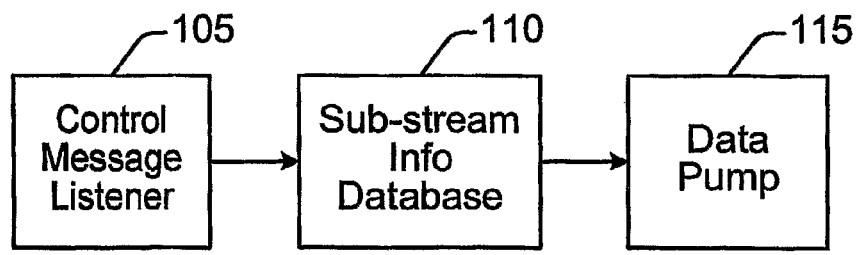
FIG. 1 is a block diagram of an architecture of a sending peer in accordance with the present invention.

As shown in FIG. 1, a sending peer includes three components: a control message listener 105, a sub-stream information database 110 and a data pump 115. The control message listener 105 constantly monitors the incoming control message(s) from the receiving peer. When a control message arrives, the sending peer updates the sub-stream information database 110 accordingly. The control message is a triplet (action, sub_stream_id, time_offset). There are two types of actions that can be performed: add and delete. The control message listener 105 inserts the (sub_stream_id, time_offset) pair into the sub-stream information database 110 if the action is added, and deletes the entry in the sub-stream information database 110 with sub_stream_id if the action is deleted. The data pump 115 is responsible for sending/transmitting the sub-streams based on the sub-stream information database 110.

Figure 2:
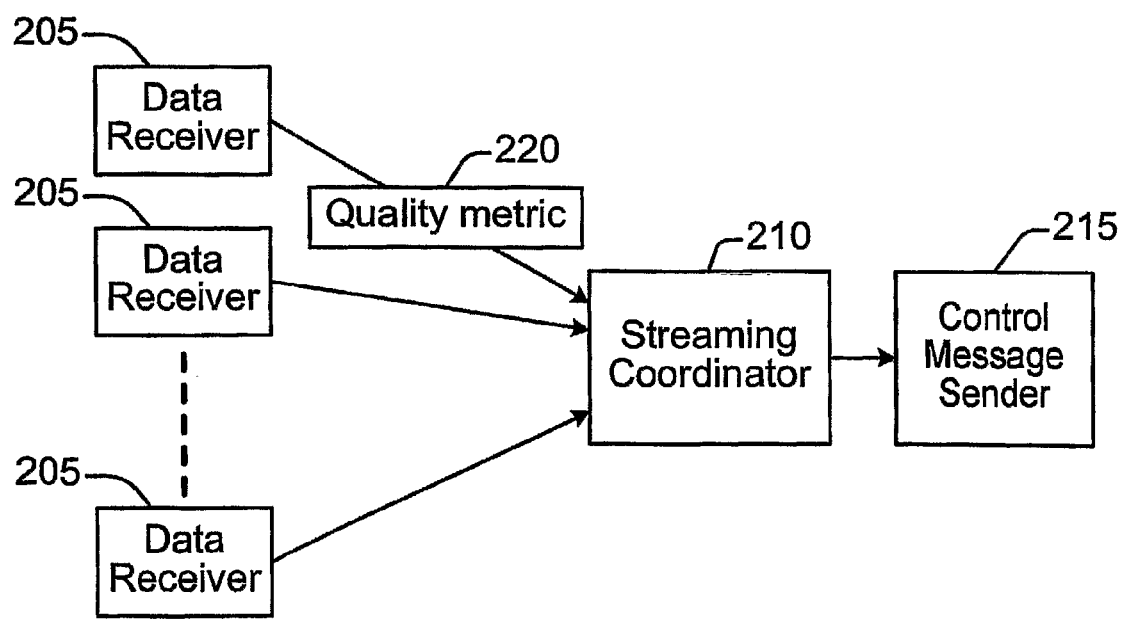
FIG. 2 is a block diagram of an architecture of a receiving peer in accordance with the present invention.

As shown in FIG. 2, the receiving peer has three types of components: a data receiver 205, a streaming coordinator 210 and a control message sender 215. One data receiver 205 is dedicated to receiving the data from one sending peer. The data receiver 205 receives the sub-streams sent from a corresponding sending peer and collects the streaming quality metric of the associated sub-streams. The streaming quality metric is defined to be the percentage of packets that arrived on time. The streaming coordinator 210 orchestrates the streaming from multiple sending peers in order to optimize the perceived the quality, i.e., the percentage of packets that arrive on time, at the receiving peer side. The control message sender 215 creates the control message(s) based on the input from the streaming coordinator 210 and sends the control message(s) to the targeted sending peers.

Figure 3:
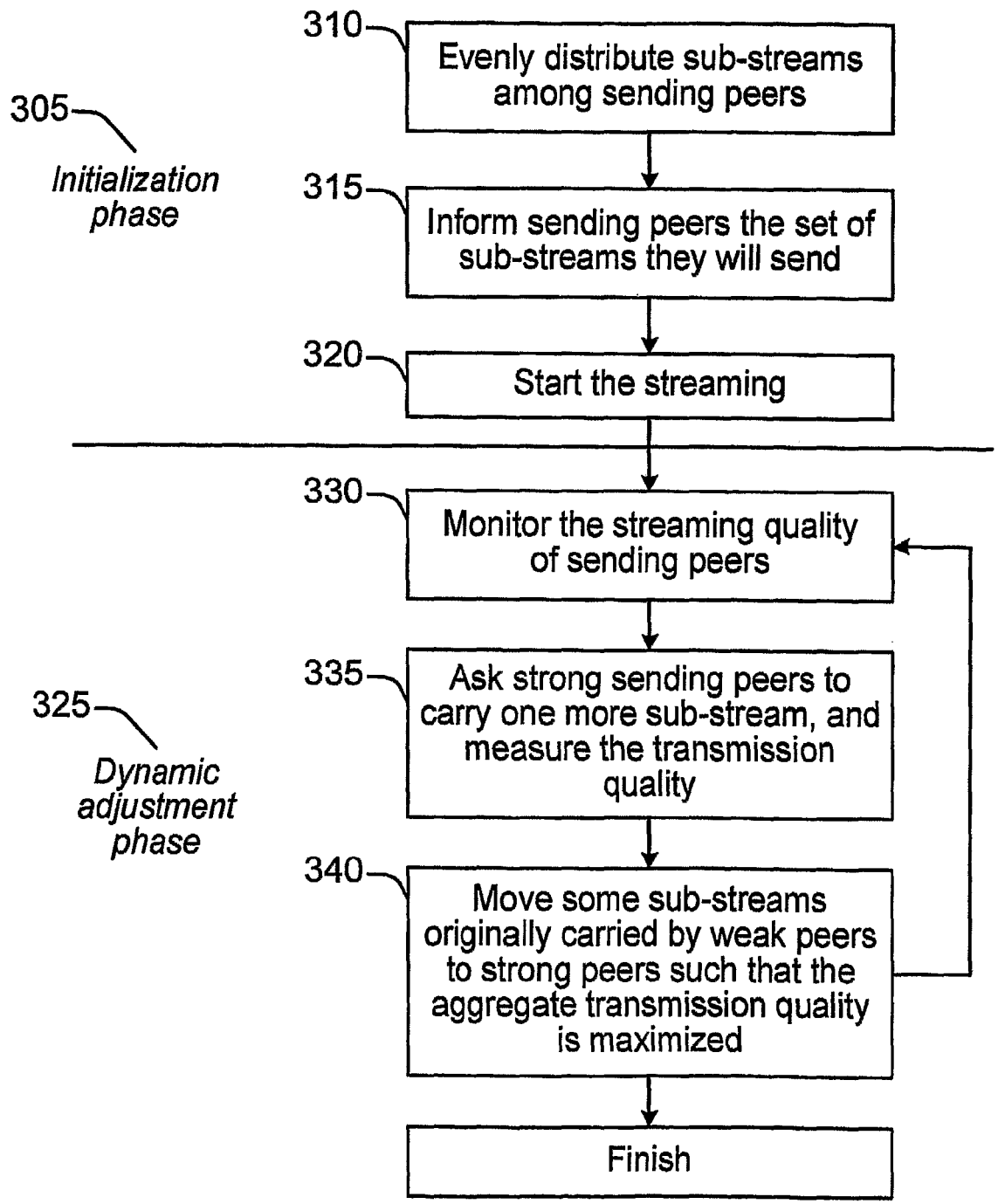
FIG. 3 is a flowchart of a method of the present invention.

The streaming coordinator 210 monitors the streaming quality of sending peers, and dynamically adjusts the number of sub-streams assigned to each sending peer so as to optimize the overall streaming quality. FIG. 3 depicts a flowchart of the workflow of the streaming coordinator 210, which consists of two phases—the initialization phase 305 and the dynamic adjustment phase 325. The method used by the streaming coordinator 210 dynamically allocates the sub-streams to the sending peers in order to optimize the streaming quality by adapting to the fluctuating available bandwidth.

Since the available upstream bandwidth from sending peer $s_i$ to receiving peer, d, is unknown, in the initialization phase the streaming coordinator 210 evenly distributes the sub-streaming among all sending peers at 310. The number of sub-streams carried by different sending peers may differ by one due to round-up error. The streaming coordinator 210 informs the sending peers of the set of sub-streams that they are requested to send/transmit at 315. The streaming coordinator 210 then issues a command to the sending peers to start the streaming simultaneously at 320.

In the dynamic adjustment phase 325, the streaming coordinator 210 periodically adjusts the number of sub-streams carried/transmitted by each sending peers. This allows the sending peers to carry/transmit the number of substreams that correctly reflects their respective available upload bandwidth and hence optimizes the aggregate transmission quality of the video.

The streaming coordinator 210 monitors the transmission quality of the sending peers at 330. The sending peers are sorted in the descending order of transmission quality. The method of the present invention swaps/exchanges m sub-streams between peers with good transmission quality and peers with poor transmission quality. The value of m is a configuration parameter and should be smaller than N/2. The top m ranked sending peers are denoted as strong sending peers; and the bottom m ranked sending peers are denoted as weak sending peers. By moving some of the workload from the weak peers to the strong peers, the aggregate transmission quality is maximized.

An epoch is a time interval over which the number of sub-streams each peer transmits is adjusted. The length of an epoch is a configuration parameter, which should be chosen small enough to swiftly capture the connection bandwidth change, and long enough to avoid unnecessary overhead introduced in the dynamic adjustment process. The epoch is for example 5 seconds. The dynamic adjustment process within an epoch includes two steps:try-out step and dynamic adjustment step. During the try-out step, the strong peers are asked to carry/transmit one more sub-stream for a short period of time and the transmission quality for each strong peer (with one more sub-stream than before) is measured and recorded at 335. During the dynamic adjustment step 340 of the dynamic adjustment phase, the sub-streams are moved from the weak peers to the strong peers. At most one sub-stream can be moved away from a weak peer and at most one extra sub-stream can be carried by a strong peer. The rational behind this is to make the adjustment process stable and smooth.

Figure 4:
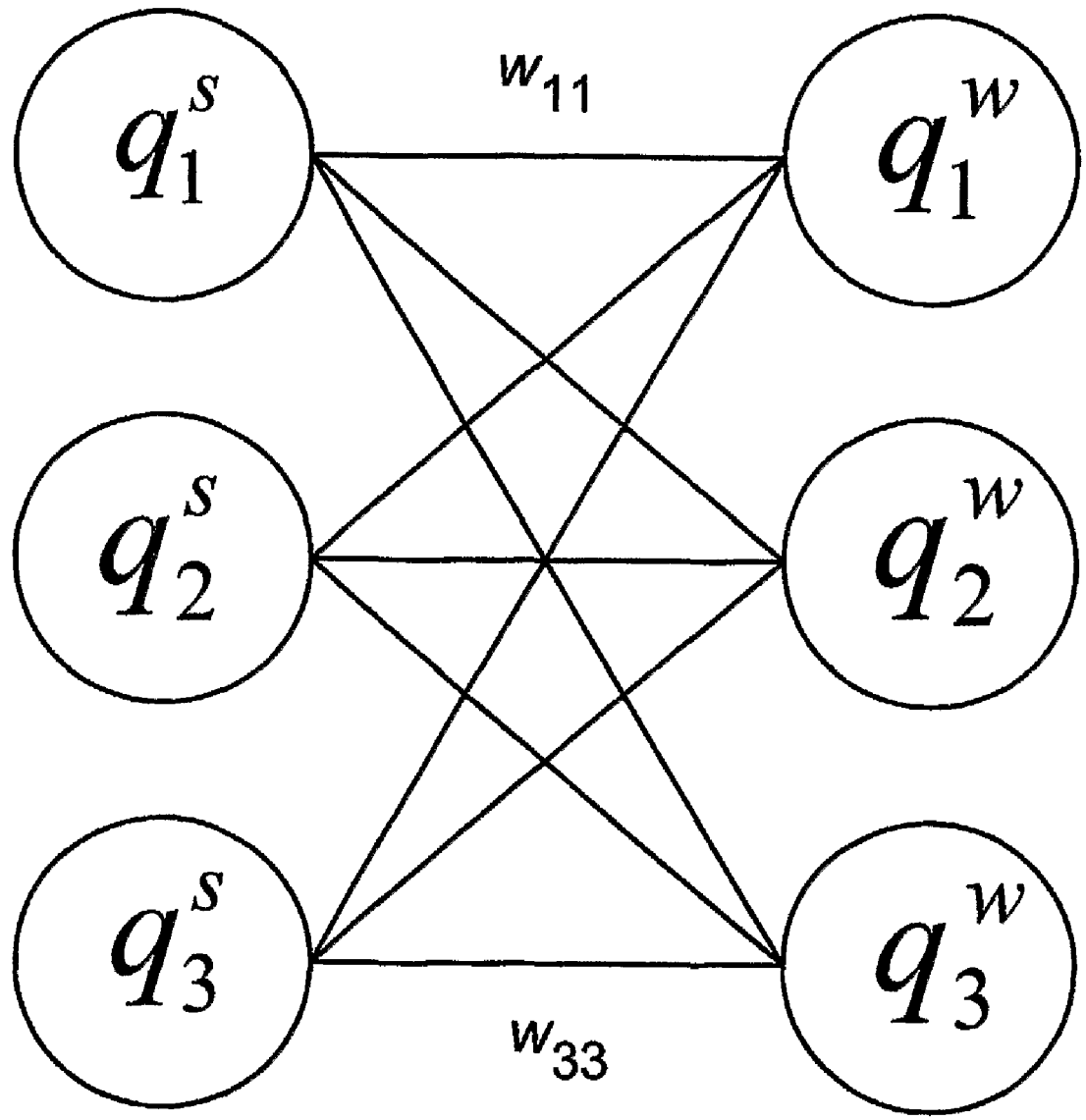
FIG. 4 is an exemplary state diagram of a Minimum-Weight-Perfect-Matching scheme of the present invention.

In an embodiment, a Minimum-Weight-Perfect-Matching (MWPM) based dynamic sub-stream adjustment maximizes the transmission quality perceived by the receiving peer. Let $\{q_i^s\}_{i=1}^M$ and $\{\tilde{q}_i^s\}_{i=1}^M$ be the transmission quality of i-th strong peer before and after carrying one more sub-stream respectively, and $\{q_i^w\}_{i=1}^M$ be the transmission quality of j-th weak peer. It is assumed that the transmission quality of weak peers does not change as a result of carrying one less sub-stream. To illustrate the problem, consider the example in FIG. 4 that has three strong peers and three weak peers. A link between a strong peer and a weak peer represents a potential sub-stream change from the weak peer to the strong peer. The weight associated with the link denotes the gain of such exchange, specifically $w_{ij}$ denotes the link weight between i-th strong peer and j-th weak peer. Thus, $$w_{ij} = \left[\left(\frac{n_i^s+1}{N}\tilde{q}_i^s + \frac{n_j^w-1}{N}q_j^w\right) - \left(\frac{n_i^s}{N}q_i^s + \frac{n_j^w}{N}q_j^w\right)\right]^+, \quad (1)$$

where $n_i^s$ denotes the number of sub-streams carried by i-th strong sending peer and $n_j^w$ denotes the number of sub-streams carried by j-th weak sending peer.

The first term within the square brackets of equation (1) is the aggregate transmission quality of strong and weak peer after switching one sub-stream from the weak peer to the strong peer. The second term is the aggregate transmission quality before the sub-stream exchange. Since no sub-stream exchange occurs, if no transmission improvement can be achieved, [•]$^+$ is used to denote that the weight is non-negative. In case the weight is equal to zero, no sub-stream exchange is implied. The optimal sub-stream adjustment is equivalent to finding a perfect matching in the bi-partite graph that maximizes the sum of weights. A bi-partite graph is an undirected graph G=(V,E) in which V can be partitioned into two sets V1 and V2 such that (u,v) in E implies either u in V1 and v in V2 or u in V2 and v in V1. That is, all edges go between the two sets V1 and V2. This problem can be solved using the Minimum-Weight-Perfect-Matching algorithm of the present invention.

As the sub-stream adjustment continues, some sending peers can end up carrying no sub-streams. Such sending peers are called idle sending peers. One way to deal with such idle sending peers is to simply exclude them from the sending peer pool. Another way is to select an idle sending peer with a certain probability as strong peer and assign the idle sending peer one sub-stream to carry. The same algorithm described above is then applied. The rational is to give these idle sending peers a chance to contribute, in case their upload bandwidth has improved significantly since the last time interval (epoch).

In the above discussion, the link outage condition was not considered. In this situation, a link is broken and the connection between a sending peer and the receiving peer is lost. Such a condition is handled by setting up a threshold and actively excluding the un-connected (or badly connected) peers from the sending peer pool. For instance, the value of threshold can be set to δ. If a sending peer's transmission quality is lower than the threshold, it is removed from the sending peer pool and its sub-streams will be evenly distributed to the strong peers selected in the previous time interval (epoch).

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method of transmitting data, said method comprising:
   partitioning a stream of data into a plurality of sub-streams;
   establishing an allocation of said plurality of sub-streams among a plurality of sending devices;
   enabling said plurality of sending devices to begin transmitting said plurality of sub-streams in parallel in accordance with said allocation;
   monitoring a transmission quality of said plurality of sending devices;
   sorting said plurality of sending devices based on their transmission quality;
   selecting a pre-determined number of said devices of said plurality of sending devices with good transmission quality, wherein said selected devices with good transmission quality are denoted strong sending devices; and
   selecting an equal number of devices of said plurality of sending devices with poor transmission quality, wherein said selected devices with poor transmission quality are denoted weak sending devices, and further wherein said pre-determined number of selected strong sending devices is less than half of a number of said plurality of sending devices
   exchanging a pre-determined number of sub-streams between devices of said plurality of sending devices with poor transmission quality and devices of said plurality of sending devices with good transmission quality; and
   adjusting said allocation.

2. The method according to claim 1, wherein said exchanging act further comprises:
   requesting said strong sending devices to transmit an additional sub-stream previously allocated to said weak sending devices for a pre-determined period of time;
   measuring and recording transmission quality of said strong sending devices transmitting said additional sub-stream; and
   moving said additional sub-stream from said weak sending devices to said strong sending devices that continue to have good transmission quality after said pre-determined period of time.

3. The method according to claim 1, further comprising:
   associating a weight with each link between said strong sending devices and said weak sending devices, said weight being reflective of a gain of said exchanging act; and
   performing said exchanging act between said strong sending devices and said weak sending devices based on maximizing a sum of said weights.

4. The method according to claim 1, wherein said plurality of sending devices are members of a peer-to-peer network, and further wherein receiving devices of a plurality of receiving devices are members of said peer-to-peer network.

5. The method according to claim 1, wherein said pre-determined number of sub-streams is greater than a number of said plurality of sending devices.

6. The method according to claim 3, wherein a bandwidth of said peer-to-peer network is asymmetric, said receiving devices having sufficient bandwidth to receive said stream of data at a rate at greater than or equal to a combined rate of said plurality of sending devices.

7. The method according to claim 1, wherein said packets of said stream of data are of equal size.

8. The method according to claim 1, wherein each sub-stream consists of one packet of every pre-determined number of sub-streams.

9. The method according to claim 1, wherein each sending device has said stream of data, said stream of data being stored at each sending device as a collection of packets of equal size.

10. The method according to claim 1, wherein said packets have sequence numbers indicating their position in said stream of data.

11. The method according to claim 1, wherein said stream of content is a video stream of data.

12. The method according to claim 1, wherein said exchanging act occurs in a pre-determined time interval, said pre-determined time interval being a configuration parameter.

13. The method according to claim 12, wherein said pre-determined time interval is short enough to capture a bandwidth change and long enough to avoid unnecessary overhead, said pre-determined time interval being denoted as an epoch.

14. The method according to claim 3, wherein said weight associated with each link is given by $$w_{ij} = \left[\left(\frac{n_i^s+1}{N}\tilde{q}_i^s + \frac{n_j^w-1}{N}q_j^w\right) - \left(\frac{n_i^s}{N}q_i^s + \frac{n_j^w}{N}q_j^w\right)\right]^+,$$

wherein $n_i^s$ denotes a number of sub-streams carried by i-th strong sending device and $n_j^w$ denotes a number of sub-streams carried by j-th weak sending device.

15. A system for transmitting a stream of data partitioned into a plurality of sub-streams, comprising:
   a receiving device for receiving said stream of data from a plurality of sending devices, wherein said plurality of sending devices sends at least one of said plurality of sub-streams; and,
   a streaming coordinator, wherein said streaming coordinator
   (a) establishes an allocation of said plurality of sub-streams among said plurality of sending devices;
   (b) enables said plurality of sending devices to simultaneously begin transmitting said plurality of sub-streams in accordance with said allocation;
   (c) monitors a transmission quality of said plurality of sending devices;
   (d) sorts said plurality of sending devices based on their transmission quality;
   (e) selects a pre-determined number of said devices of said plurality of sending devices with good transmission quality, wherein said selected devices with good transmission quality are denoted strong sending devices;
   (f) selects an equal number of devices of said plurality of sending devices with poor transmission quality, wherein said selected devices with poor transmission quality are denoted weak sending devices, and further wherein said pre-determined number of selected strong sending devices is less than half of a number of said plurality of sending devices;
   (f) exchanges a pre-determined number of sub-streams between devices of said plurality of sending devices with poor transmission quality and devices of said plurality of sending devices with good transmission quality; and
   (g) adjusts said allocation.

16. The system according to claim 15, wherein said streaming coordinator adjusts said allocation by further:
   requesting said strong sending devices to transmit an additional sub-stream previously allocated to said weak sending devices for a pre-determined period of time;
   measuring and recording transmission quality of said strong sending devices transmitting said additional sub-stream; and
   moving said additional sub-stream from said weak sending devices to said strong sending devices that continue to have good transmission quality after said pre-determined period of time.

17. The system according to claim 15, wherein said streaming coordinator further:
   associates a weight with each link between said strong sending devices and said weak sending devices, said weight being reflective of a gain of said exchanging act; and
   performs said exchanging act between said strong sending devices and said weak sending devices based on maximizing a sum of said weights.

18. The system according to claim 15, wherein said plurality of sending devices are members of a peer-to-peer network, and further wherein said receiving device is a member of said peer-to-peer network.

19. The system according to claim 18, wherein said sending devices each further comprise:
   a control message listener;
   a sub-stream information database; and
   a data pump.

20. The system according to claim 19, wherein said control message listener constantly monitors incoming control messages from said receiving devices.

21. The system according to claim 20, wherein when a new control message arrives from one of said receiving devices, said sending device that receives said new control message updates said sub-stream information database.

22. The system according to claim 18, wherein said streaming coordinator is part of said receiving device.

23. The system according to claim 22, wherein said receiving device further comprises:
   a plurality of data receivers, each data receiver of said plurality of data receivers dedicated to receiving sub-stream data from one of said sending devices; and
   a control message sender.

24. The system according to claim 23, wherein each data receiver of said plurality of data receivers collects a streaming quality metric from its associated sending device, wherein said streaming quality metric is a percentage of said packets of said sub-stream that arrive on time.

25. The system according to claim 24, wherein said streaming coordinator orchestrates the streaming from said sending devices, and further wherein said streaming coordinator monitors said streaming quality metric received from each of said sending devices and dynamically adjusts a number of sub-streams transmitted by said sending devices periodically.

26. The system according to claim 23, wherein said control message sender creates control messages based on input from said streaming coordinator and transmits said control messages to said sending devices.

27. The system according to claim 19, wherein said data pump transmits said sub-streams based on information in said sub-stream information database.

* * * * *

UNITED STATES PATENT AND TRADEMARK OFFICE
CERTIFICATE OF CORRECTION

PATENT NO. : 8,150,966 B2
APPLICATION NO. : 12/309371
DATED : April 3, 2012
INVENTOR(S) : Yang Guo, Saurabh Mathur and Kumar Ramaswamy It is certified that error appears in the above-identified patent and that said Letters Patent is hereby corrected as shown below:

Title Page, Item (12) should read:
-- Guo et al. --

Title Page, Item (75) should read:
-- Yang GUO --

Signed and Sealed this
Nineteenth Day of March, 2013

Teresa Stanek Rea
*Acting Director of the United States Patent and Trademark Office*